(12) United States Patent
Kelly

(10) Patent No.: US 6,474,573 B1
(45) Date of Patent: Nov. 5, 2002

(54) ELECTROSTATIC ATOMIZERS

(75) Inventor: Arnold J. Kelly, Princeton Junction, NJ (US)

(73) Assignee: Charge Injection Technologies, Inc., Monmouth Junction, NJ (US)

( * ) Notice: Subject to any disclaimer, the term of this patent is extended or adjusted under 35 U.S.C. 154(b) by 0 days.

(21) Appl. No.: 09/476,246

(22) Filed: Dec. 30, 1999

Related U.S. Application Data

(60) Provisional application No. 60/114,727, filed on Dec. 31, 1998.

(51) Int. Cl.$^7$ ................................................ B05B 5/00
(52) U.S. Cl. ....................................... 239/690; 239/696
(58) Field of Search ........................... 239/3, 690, 695, 239/708, 696, 704

(56) References Cited

U.S. PATENT DOCUMENTS

| | | | | |
|---|---|---|---|---|
| 4,150,644 A | * | 4/1979 | Masaki et al. | 239/3 |
| 4,255,777 A | | 3/1981 | Kelly | 361/228 |
| 4,435,190 A | * | 3/1984 | Taillet et al. | 239/3 |
| 4,613,075 A | * | 9/1986 | Owen | 239/3 |
| 4,962,885 A | * | 10/1990 | Coffee | 239/3 |
| 5,011,085 A | * | 4/1991 | Loof | 239/690 |
| 5,093,602 A | | 3/1992 | Kelly | 313/231.01 |
| 5,176,321 A | * | 1/1993 | Doherty | 239/3 |
| 5,378,957 A | | 1/1995 | Kelly | 313/231.01 |

* cited by examiner

Primary Examiner—Lesley D. Morris
Assistant Examiner—Christopher Kim
(74) Attorney, Agent, or Firm—Lerner, David, Littenberg, Krumholz & Mentlik, LLP

(57) ABSTRACT

An electrostatic atomizer includes a body defining an interior space and a discharge orifice communicating with the interior space. An emitting electrode or electron gun is disposed inside the body so as to apply charges to the fluid passing through the interior space. A counter electrode is disposed outside the body. The exposed surfaces on the interior of the body are formed from a dielectric material so that there are no substantial electric field between exposed conductive elements on the inside of the body. This arrangement minimizes soot buildup and plugging of the orifice. The device may include a single element defining numerous orifices and formed by micro-machining techniques such as those used in fabrication of semiconductor devices. Orifice sizes as small as a few micrometers can use successfully to provide controllable atomization at extremely low flow rates.

30 Claims, 5 Drawing Sheets

ELECTROSTATIC ATOMIZERS

CROSS-REFERENCE TO RELATED APPLICATIONS

Figure 1:
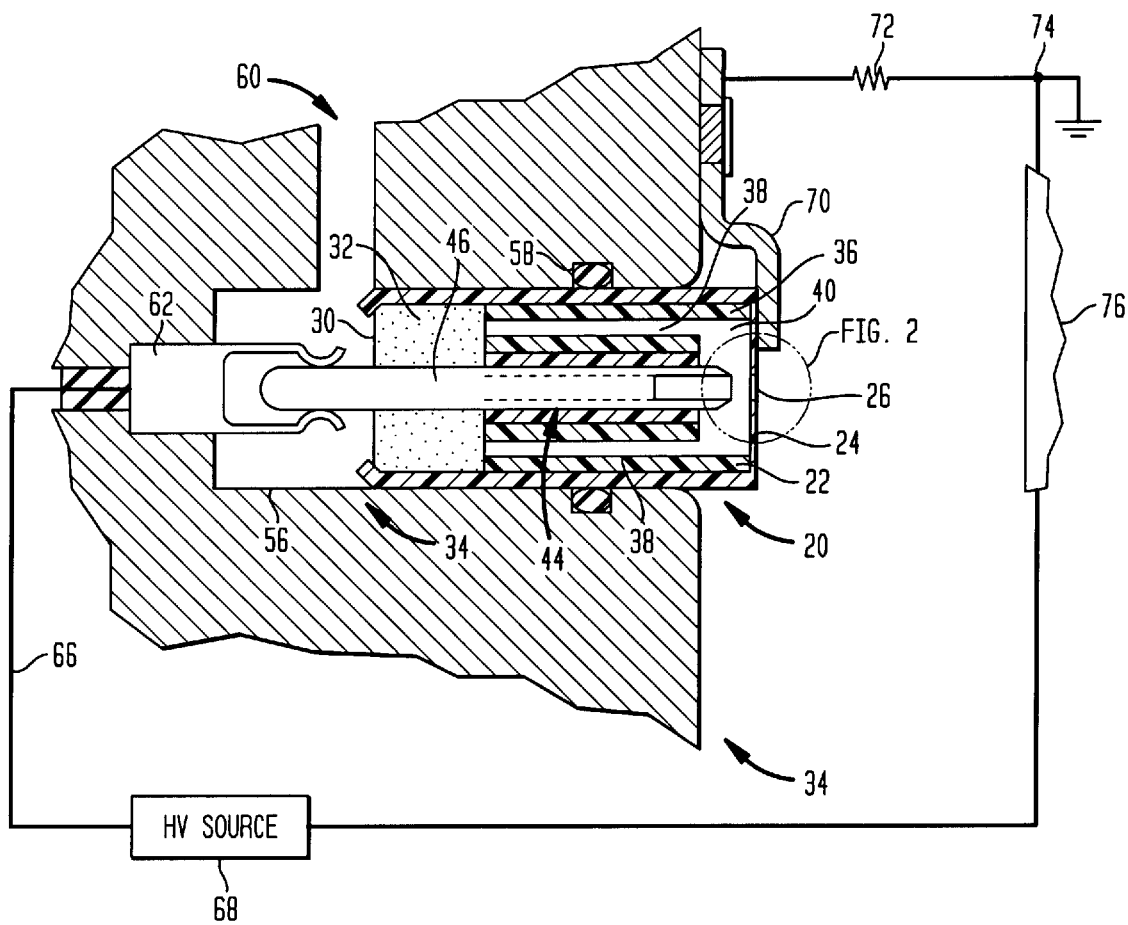

The present application claims benefit of U.S. Provisional patent application No. 60/114,727, filed Dec. 31, 1998, the disclosure of which is hereby incorporated by reference herein.

GOVERNMENT RIGHTS

Applicant's invention was supported in part by Department of Defense (Army) Contract No. DAAN002-98-P-8570. Therefore, the Government may have certain rights in the invention.

FIELD OF THE INVENTION

The present invention relates to electrostatic atomizers.

BACKGROUND OF THE INVENTION

As described in U.S. Pat. No. 4,255,777, the disclosure of which is incorporated by reference herein, a fluid can be atomized by injecting an electrically charge into it. In certain embodiments taught in the '777 patent, the fluid passes through a housing and out of a discharge orifice defined by a wall of the housing. An electron emitter electrode, also referred to as a charge injection electrode, is disposed immediately upstream of the discharge orifice. Typically, the wall defining the orifice itself is a metallic body and serves as a second electrode. The second electrode which is maintained at a different electrical potential from the charge injection electrode or emitter. Under these conditions, electric charges leave one of the electrodes and move towards the other electrode through the fluid For example, where the emitter is maintained at a negative potential with respect to the second or aperture electrode, electrons leave the emitter electrode and move towards the second electrode through the flowing fluid. Because the charges have a finite, limited velocity within the flowing fluid, some or all of the charge is carried out through the orifice with the flowing fluid before such charge reaches the second electrode. The stream of fluid passing out of the orifice thus carries a net charge. Because the fluid has a net charge, the various portions of the fluid repel one another. Such repulsion causes the fluid to break apart or atomize The charges are ultimately discharged by a third, ground electrode outside of the orifice.

Other electrostatic atomization systems described in certain preferred embodiments of U.S. Pat. Nos. 5,093,602 and 5,378,957, the disclosures of which are hereby incorporated by reference herein, utilize electron beams to introduce charge into the fluid. Systems of this type have a small electron gun mounted adjacent to discharge orifice. Typically, the electron gun incorporates a housing having an interior space maintained under vacuum. An electron-transmissive window is provided over on opening in the electron-gun housing. A cathode and accelerating electrodes within the electron gun form an electron beam which is directed through the window into the fluid as the fluid passes into and through the orifice. Here again, a net charge is introduced into the fluid and the fluid is atomized by mutual repulsion between charged portions of the fluid.

Electrostatic atomization systems as discussed above offer numerous advantages over conventional atomization systems. In particular, the degree of atomization is controlled by the amount of charge introduced into the fluid. The preferred systems described in the aforementioned patents can apply substantial net charge and can provide very effective atomization. These systems do not depend upon mechanical action for atomization. Thus, it is possible to dispense with many of the elements commonly found in mechanical atomization systems. For example, there is no need to force the fluid through a fine orifice at a high flow rate to induce atomization by shear, and no need to supply high-velocity jets of compressed gas to induce atomization. The system can operate at low fluid pressures and with any desired flow rate. These features facilitate construction of simple, light weight atomization systems. Moreover, because droplet size is strongly controlled by the amount of charge injected, the system can achieve the desired degree of atomization despite variations in fluid flow rate and fluid properties such as viscosity. The systems can operate with small amounts of electrical power. Systems of these type can be used to atomize numerous different materials. However, one significant application for such systems has been in atomization of liquid fuels such as fuel oil, diesel oil, kerosene and jet engine fuel in engine and combustion applications. For example, systems of this type can be used in place of conventional fuel injectors in diesel engines and in gas turbine engines.

Because electrostatic atomization of this type can provide effective atomization even with very low flow rates, fuel can be atomized at flow rates appropriate to provide a flame having few watts to a few hundred watts of heat output. As described in co-pending, commonly assigned U.S. application Ser. No. 09/237,583, filed Jan. 26, 1999, the disclosure of which is hereby incorporated by reference herein, a small burner which provides such a flame can be used, for example, as the heating element in a small, simple cooking stove for use by an individual soldier or camper. As described in greater detail in the '583 application, such a low flow atomizer typically includes a small orifice at the atomization nozzle for regulating the fluid flow. The nozzle may be of variable size to provide variable flow rate.

Despite these and other improvements in electrostatic atomization, still further improvement would be desirable. Electrostatic atomization systems using small orifices, and especially those using orifices less than about 100 $\mu$m in diameter, can become clogged with sooty particulates. Although the present invention is not limited by any theory of operation, it is believed that this soot arises from some side effects of the electric fields applied to the fluid such as the field applied between the emitter electrode and the second or counter electrode. Thus, it is believed that phenomena associated with injection of charge into the fluid to be atomized cause chemical reactions to occur in the vicinity of the charge injection electrode or electron gun. Such reactions may cause polymerization of the fluid, particularly where the fluid is a organic liquid such as a liquid fuel. Regardless of the cause however, sooty particles tend to form inside the atomization device. These particles generally do not pose a problem in systems using relatively large discharge orifices, such as those above about 100 microns in diameter and particularly above about 500 mm in diameter. However, small apertures, particularly those below about 100 microns in diameter, can become clogged in as little as an hour of operation. Reducing the applied voltage can increase the time required for clogs to form. However, this does not provide a complete solution to the problem and limits the capability of the system. Thus, a better solution to the clogging problem would be desirable.

Moreover, it would be desirable to provide arrays of electrostatic spray nozzles. For example, in a small burner, it would be desirable to provide multiple plumes of atomized liquid fuel to provide multiple, small flames. In particular, it would be desirable to provide such an array in a form which can be manufactured readily at low cost.

SUMMARY OF THE INVENTION

The present invention addresses these needs.

One aspect of the present invention provides an electrostatic atomizer incorporating a body defining an interior space, and an exterior surface. The body also defines a fluid entry port communicating with the interior space remote from the orifice. A charge injection structure is disposed within the interior space in the vicinity of the orifice. The charge injection structure may be an emitting electrode or an electron gun as discussed above. Desirably, a counter electrode is disposed in the vicinity of the orifice. According to this aspect of the present invention, a dielectric structure is disposed between the counter electrode and the interior space, so that the counter electrode is electrically insulated from the interior space. For example, the body may incorporate a dielectric material and the dielectric material of the body may serve as the dielectric structure which insulates the counter electrode from the interior space. The counter electrode desirably overlies the exterior surface of the body on the vicinity of the orifice. The dielectric material of the body may define the orifice and the exterior surface and the counter electrode may be in the form of an electrically conductive coating on the exterior surface of the body.

Atomizers according to this aspect of the invention desirably are substantially devoid of electrically conductive surfaces exposed to the interior space other than the electrically conductive surfaces of the charge injection structure itself which are at the same electrical potential as the charge injection structure. Stated another way, the atomizer desirably does not apply electric fields in excess of about 1000 V/mm between electrically conductive surfaces exposed to the interior space, and most desirably does not apply any electric fields between electrically conductive surfaces exposed to the interior space. There may be substantial electric fields between the charge injection structure and a counter electrode outside of the body.

Atomizers according to this aspect of the invention incorporate the discovery that formation of large soot particles which cause plugging within the atomizer can be suppressed by insulating electrically conductive structures such as the second or counter electrode from the flowing fluid. Despite the dielectric exposed between the electrode and the flowing fluid, the electrode still performs the required function for atomization. For example, in a triode-type device, the electric field between the emitter electrode and the second electrode is imposed through the fluid and through the dielectric structure. Atomization proceeds substantially in the same way as where the second electrode is on contact with the flowing fluid. However, large soot particles do not form inside the atomizer and do not clog the discharge orifice, even if the orifice is of small diameter. Here again, although the present invention is not limited by any theory of operation, it is believed that by limiting or eliminating electrical fields between conductive elements, electrical currents flowing between conductive elements inside the interior space are reduced, and that this in turn reduces the tendency of sooty material formed during charge injection to agglomerate or settle on surfaces of the apparatus.

A further aspect of the present invention provides an atomizer incorporating a body having one or more interior spaces and a first wall bounding the one or more interior spaces. The first wall defines an exterior surface of the body and a plurality of orifices extending between the exterior surface and the one or more interior spaces. The body also has one or more fluid inlets communicating with the one or more interior spaces remote from the orifices. A plurality of charge injection electrodes desirably are mounted in the one or more interior spaces and are disposed adjacent the orifices. One or more counter electrodes are also disposed adjacent the orifices. Desirably, the one or more counter electrodes are disposed on the exterior surface of the first wall, and the first wall includes a dielectric structure facing the interior space or spaces to insulate the one or more counter electrodes from the interior space or spaces and provide the advantages discussed above. The body desirably includes a second wall extending generally parallel to the first wall and internal structure extending between the first and second walls. The one or more interior spaces are disposed between the first and second wall. The charge injection electrodes may be mounted to the second wall in alignment with the orifices in the first wall. Atomizers of this type may include large numbers or orifices and may include small orifices as, for example, orifices less than about 200 microns meters in diameter. The orifices may be spaced apart from one another by less than about 500 micrometers. In a particularly preferred arrangement, the orifices are less than about 50 microns in diameter and are spaced apart from one another by less than about 125 micrometers. As further discussed below, structures of this type can be formed by microstructure fabrication techniques similar to those commonly employed to a manufacture semiconductor chips and the like. As also discussed below, the optimum spacing between the charge injection electrodes and the discharge orifices is directly related to orifice size. The use of numerous small orifices instead of a single larger orifice thus permits the use of smaller spacing, which in turn allows operation at lower voltages. Operation at lower voltages permits the use of simpler, more economical power supplies. Preferred atomization devices according to this aspect of the invention can be made to provide essentially any desired flow rate at any specified fluid inlet pressure.

BRIEF DESCRIPTION OF THE DRAWINGS

FIG. 1 is a fragmentary, diagrammatic sectional view depicting an atomizer in accordance with one embodiment of the invention in conjunction with components of the stove.

FIG. 2 is fragmentary, sectional view on an enlarged scale depicting the area indicated in FIG. 1.

FIG. 3 is a fragmentary, partially sectional diagrammatic perspective view depicting an atomizer in accordance with a further embodiment of the invention.

FIG. 4 is a sectional view along line 4—4 in FIG. 3, on a reduced scale showing a larger portion of the atomizer than FIG. 3.

FIG. 5 is a fragmentary, diagrammatic perspective view depicting a portion of an atomizer according to a further embodiment of the invention.

FIG. 6 is a fragmentary, diagrammatic elevational view depicting a portion of the atomizer shown in FIG. 5.

FIG. 7 is a fragmentary, diagrammatic sectional view depicting a portion of an atomizer according to a further embodiment of the invention.

FIG. 8 is a fragmentary, diagrammatic sectional view depicting a portion of an atomizer according to yet another embodiment of the invention.

FIG. 9 is a view similar to FIG. 3 but depicting an atomizer according to a further embodiment of the invention.

DETAILED DESCRIPTION OF THE PREFERRED EMBODIMENTS

An atomizer in accordance with one embodiment of the invention incorporates a hollow housing 20 defining an interior space 22 and a first wall 24 at a downstream end of the housing. The first wall 24 has an exterior surface 28 facing outwardly away from the interior space 22 and has an orifice 26 extending through the first wall, between the interior space 22 and exterior surface 28. Housing 20 further defines an opening at its upstream end 30 forming a fluid inlet to interior space 22. Housing 20 desirably is formed from a dielectric material such as a polymer as, for example, a poly (amide-imide) polymer of the type sold under the trademark TORLON or from any other polymer having suitable chemical resistance and thermal properties sufficient to withstand the temperatures which will be encountered during service. The housing can be formed by injection molding or other melt-processing techniques or else can be made by machining a preexisting slab, billet or rod. Alternatively, the housing can be formed from a ceramic such as a crystalline or partially crystalline ceramic or an amorphous, glassy ceramic.

A porous filter 32 is mounted in inlet 30. The porous filter may include, for example, a sintered or expanded polymer filter having a pore size smaller than the diameter of discharge orifice 26. For example, the filter 32 may be a 20 $\mu$m pore size expanded polyethylene filter. Filter 32 is retained in housing 20 by crimping the wall of the housing slightly as indicated at 34. An interior insulator and spacer 36 having numerous passages 38 is disposed inside of interior space 22. Passages 38 extend from filter 32 to a plenum or antechamber 40 within interior space 22, just upstream from orifice 26. Insulator 38 may be formed from any convenient dielectric material resistant to the fluid to be atomized and resistant to the temperatures encountered in service. For example, a castable acrylic or epoxy may be employed to form this element.

An emitter electrode 44 is mounted in the interior space 22 of the housing. Emitter electrode 44 includes a conductive metal element 46 such as a metal pin having a setaceous element 48 (FIG. 2) mounted a downstream end of the pin 46. Setaceous element 48 has numerous small points to facilitate emission of electrical charges from this element. For example, setaceous element 48 may be formed from a material such as yttria-stabilized zircona-tungsten eutectic. Alternatively, the tip 48 of the emitter may be a nonsetaceous element such as a thoriated tungsten rod. A rod of 2% thorium in tungsten can be used. Insulator 36 covers the metallic surfaces of pin 46, leaving only a small portion of the pin and tip element 48 exposed within interior space 22. For example, the insulator 36 may be cast in place around pin 46. The insulator and filter 32 support the emitter electrode 44 so that the tip 48 is aligned with orifice 26 and positioned just slightly upstream of the orifice.

Figure 2:
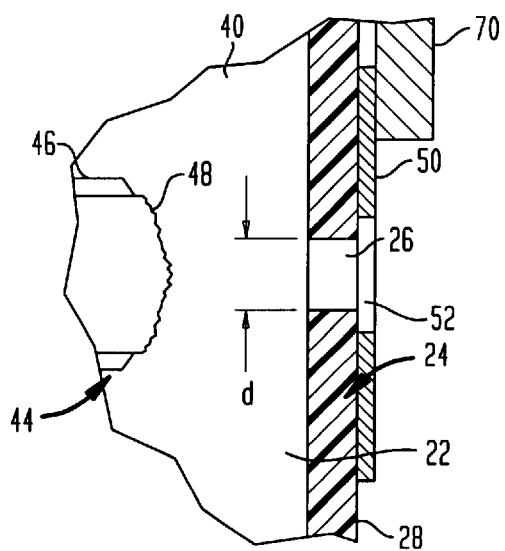

As best seen in FIG. 2, a counter electrode 50 is disposed on the exterior surface 28 of first wall 24 and surrounds orifice 26. The counter electrode may be a metallic washer formed separately from wall 24, or else may be a metallic or other conductive coating applied on the exterior surface of the wall. Electrode 50 has an opening 52 in its center, aligned with orifice 26. Where electrode 50 is formed as a coating on wall 24, such a coating may be deposited by plating procedures such as electroless plating followed by electroplating to build up the desired thickness. The thickness of electrode 50 is exaggerated for clarity of illustration in FIG. 2. No minimum thickness is required beyond that required for electrical continuity.

Orifice 26 has an interior diameter d less than about 200 micrometers, desirably less than about 100 micrometers and preferably about 50 micrometers or less. The length or axial extent of orifice 26 is equal to the thickness of wall 24 at the orifice. The spacing between the tip of 48 of the charge injection electrode and the upstream end of discharge orifice 26 desirably is about 0.5 to about 2.0 times the diameter of the orifice. The thickness of wall 24 should be as small as possible to minimize the distance between the counter electrode 50 and charge injection electrode 44, and thereby minimize the voltage required to produce a given electric field between these two electrodes. The minimum thickness of wall 24 is set by mechanical strength requirements and the need to provide a pinhole-free wall which withstands the applied voltages without dielectric breakdown.

The atomizer is mounted in the base 54 of a stove or other device which employs an atomized fluid. Housing 20 is received in a bore 56 of base 54 and an O-ring 58 is provided for making a seal around the exterior of the housing. The downstream end of the housing, including wall 24 and orifice 26, is exposed to the exterior of the base 54. A passage 60 in base 54 communicates with bore 56 and hence communicates with the fluid inlet or opening 30 of body 20. Base 54 may also be formed from any convenient material, including dielectric materials such as polymer or a ceramic. Metals and other conductive materials can be used if appropriate insulation is provided for the high voltage connection discussed below.

A high voltage connection clip 62 is attached to the pin 46 of emitter electrode 44. Clip 62 is attached to a high voltage lead 66, which is connected to one terminal of a high voltage source 68. A metal ground clip 70 is mounted to base 54. Clip 70 bears on counter electrode or second electrode 50 (FIG. 2) and on the exterior surface 28 of the housing wall so that the clip retains housing 20 in base 54. Clip 70 is also in electrical contact with second electrode or counter electrode 50. Clip 70 and hence the second electrode are connected through a resistor 72 to a ground node 74. Resistor 72 may be omitted and clip 70 may be connected directly to ground. The ground node 74 is connected to the third or ground electrode 76 of the system. The ground electrode 76 may be disposed remote from the other electrodes and remote from the discharge orifice 26. For example, in a stove the ground electrode may be a metallic part on the stove base such as a lid, a hinge or a part of the base. Ground node 74 is connected to the ground connection of high voltage source 68.

In operation, a fluid such as a liquid fuel as, for example, diesel fuel, jet fuel, kerosene or home heating oil is supplied through inlet passage 60 in the base under a low pressure as, for example, approximately 100 kPa (14.5 psig) or less and desirably as low as 20 kPa (about 3 psig). The fluid flows downstream through filter 32 and within passages 38 through the interior space 22 of housing 20. The flowing fluid reaches plenum 40 and passes within the plenum in a generally radial direction, between tip 48 of the emitter electrode 44 and wall 24. Source 68 is operated to apply an atomizing voltage between emitter electrode 44 and the second electrode or counter electrode 50. This voltage appears as an electric field between the tip 48 and the counter electrode 50 (FIG. 2). The field of course extends through the dielectric of wall 24 and through the fluid itself. The desired atomizing voltage depends on the physical configuration of the system. Typically, this voltage is selected to provide an electric field on the order of 5 kV/mm or more, and most typically about 15 kV/mm, between the emitter electrode and the counter electrode. The operating voltage required to provide such field depends on the spacing between emitter electrode tip 48 and counter electrode 50. That spacing is directly related to the orifice size. Thus, with relatively small orifices, it is practical to use a small spacing between the emitter and the upstream end of the orifice, which in turn minimizes the distance between the emitter electrode and counter electrode.

Under the influence of the applied voltage, charges leave the charge injection or emitter electrode 44 at tip 48 and enter the fluid flowing radially inwardly towards orifice 26. The charges move toward counter electrode 50, but cannot reach the counter electrode before the fluid passes out of orifice 26. The fluid exiting from the orifice is thus electrically charged. The electrically charged fluid breaks apart under the influence of the charges. The charges are dissipated into ground electrode 76, into counter electrode 50, or both.

The use of a dielectric wall 24 segregating the second electrode or counter electrode 50 from the flowing fluid substantially reduces the inter-electrode current flowing in the device. That is, essentially all of the charge leaving the charge injection or emitter electrode 44 is ultimately incorporated into the fluid exiting through orifice 26 and performs useful work in atomizing the fluid. The inter electrode current between emitter electrode 44 and second electrode or counter electrode 50 is substantially lower than the comparable current in a system using a counter electrode having a conductive portion exposed to interior space 22 as, for example, a solid metal conductive orifice used as an electrode.

The system according to this embodiment of the present invention is essentially immune to soot clogging. Orifice 26 does not become clogged due to soot formed within the atomizer. Filter 32 prevents clogging due to particulates in the incoming fluid. To preserve cleanliness within the housing during shipment and storage, orifice 26 may be covered with a temporary closure such as a piece of adhesive tape overlying the second electrode 50. Such a tape is removed manually before the device is used. Alternatively, the orifice may be plugged with a grease or gel soluble in the fluid to be atomized. The initial fluid supplied to the device washes the plug out of the orifice.

Desirably, any metallic elements or electrically conductive parts other than the tip of the emitter electrode disposed within the interior space 22 are covered by a dielectric layer and separated from the flowing fluid by the dielectric layer. Stated another way, the interior surfaces of the housing bounding interior space 22 and other elements such as insulator 36 disposed to the interior space are substantially devoid of exposed electrically conductive surfaces so that the only exposed conductive surfaces are the surfaces of the charge injection electrode itself, at and near the point of charge injection. Thus, the only electrically conductive surfaces exposed to the interior space are at the same potential as the charge injection electrode. There is no path to ground through a conductive surface exposed to interior space 22. There is no electrical potential difference between conductive surfaces exposed to interior space 22. Although the present invention is not limited by any theory of operation, it is believed that in the absence of potential difference between exposed conductive surfaces, agglomeration and deposition of soot within the chamber is substantially reduced or eliminated.

Some modification of the foregoing principles can be employed. For example, an exposed conductive surface within interior space 22 at a great distance from the charge injection electrode or at a potential only slightly different from the charge injection electrode would be expected to produce only minimal deposition or agglomeration of soot. Thus, although it is preferred to practice the invention with no potential differences between exposed conductive surfaces on the inside of the chamber, some potential differences between such exposed conductive surfaces can be tolerated. The maximum potential difference that can be tolerated depends upon factors such as the composition of the fluid and its tendency to form soot; the geometry of the apparatus; and the required lifetime before soot plugging occurs. In general, however, if any potential differences between conductive surfaces exposed to the interior space occur, the electric field between such exposed conductive surfaces desirably is less than about 1000 V/mm, more preferably less than 500 V/mm and most preferably less than 100 V/mm.

Figure 3:
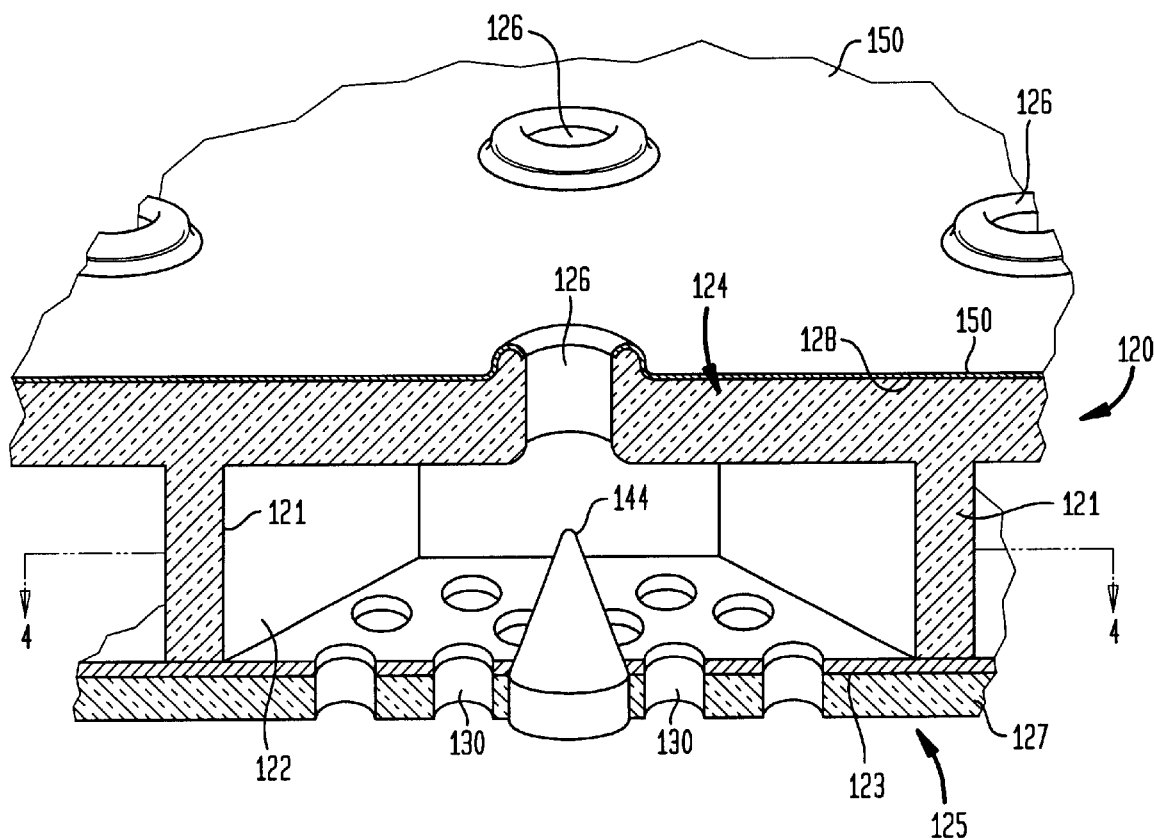
Figure 4:
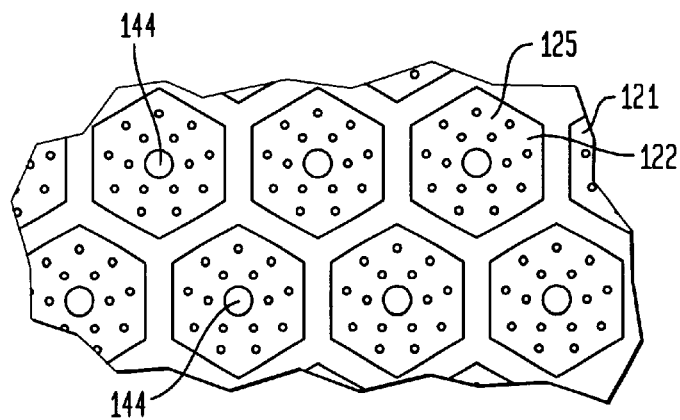
Figure 5:
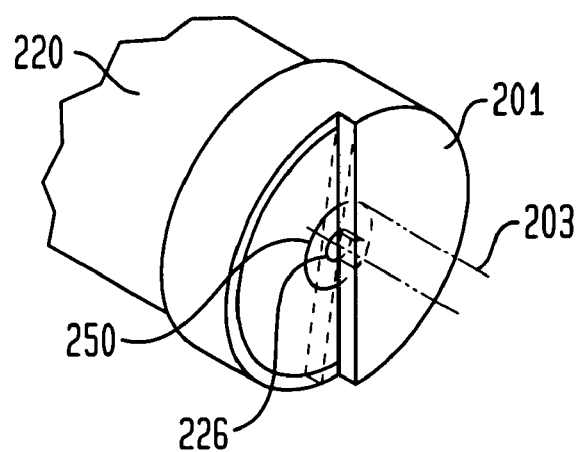
Figure 6:
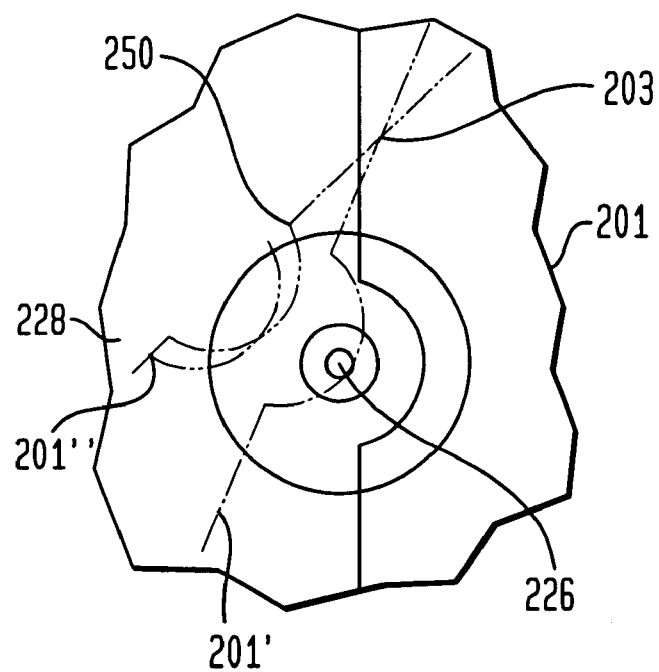
Figure 7:
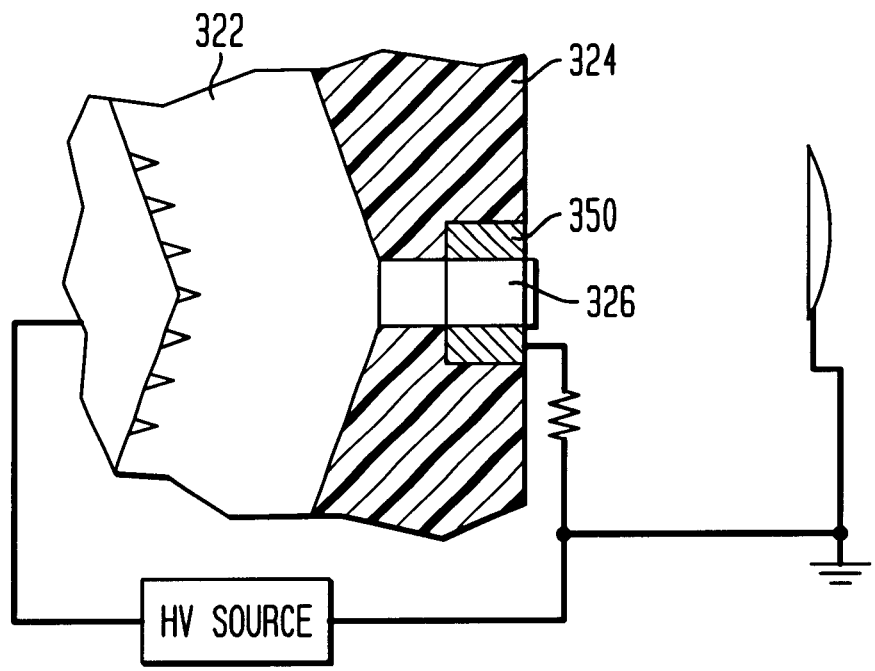
Figure 8:
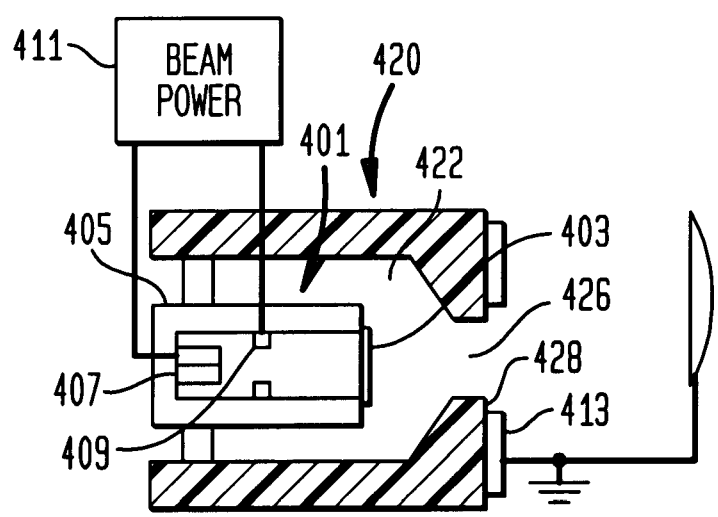

Apparatus according to a further embodiment of the invention, depicted in FIGS. 3 and 4 includes a body 120 having a first wall 124 and a second wall 125 generally parallel to the first wall but spaced therefrom. The first wall 124 defines a plurality of discharge orifices 126. Wall 124 is formed from a dielectric material such as silicon dioxide and defines an exterior surface 128. A common external electrode 150 is formed on the exterior surface 128 by depositing a coating of an electrically conductive material such as a metal on this surface. First wall 124 and second wall 125 are held apart from one another by internal structure 121 in the form of a plurality of walls subdividing the space between the walls into a large number of hexagonal chambers or internal spaces 122. Hexagonal spaces 122 are disposed on center with orifices with 126, so that each orifice is aligned with the center of one hexagonal space. Emitter electrodes 144 are mounted to second wall 125 in alignment with orifices 126. Second wall 125 incorporates a dielectric layer 123 and a conductive layer 127 electrically connected to all of the emitter electrodes 144. The second wall 125 has a large number of fluid inlet orifices 130 extending through it. These orifices form a filter. The relative size of the orifices 130 is exaggerated in FIGS. 3 and 4 for quality of illustration. In practice, the orifices 130 should be considerably smaller than discharge orifices 126 so as to provide a filter at the fluid inlet of the device.

Figure 9:
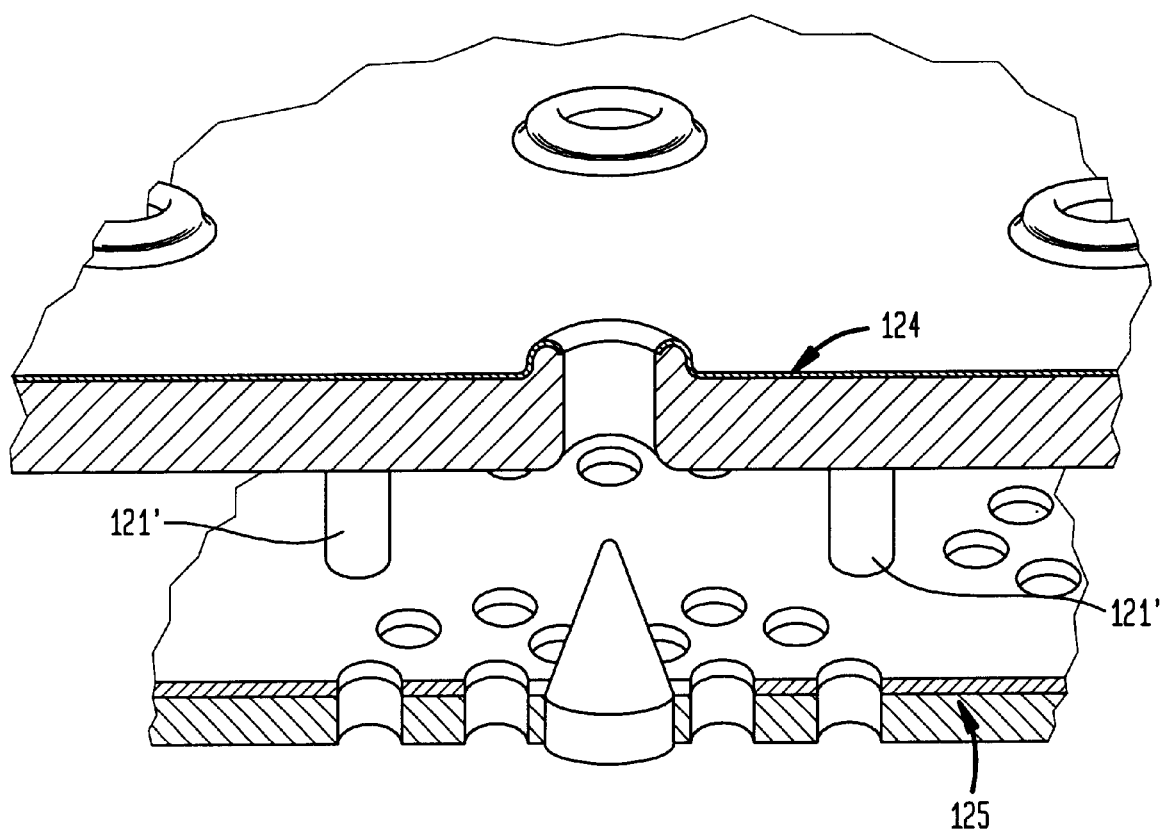

Atomization devices according to this embodiment of the invention can be fabricated using micro-mechanical fabrication techniques, similar to the techniques used for forming semiconductor chips and related devices. For example, the first wall 124 and internal structures 121 can be fabricated as a unit from a single wafer of silicon using photo-etching techniques and the silicon can be oxidized to form silicon dioxide dielectric. Similarly, the dielectric portion 123 of second wall 125 can be fabricated by photo-etching techniques, whereas the metal layer 127 can be applied by plating, vacuum deposition or other conventional metal-application techniques used in semiconductor fabrication. The emitter electrodes can be formed by etching and/or deposition on the same wafer or other mass of material used to form the second wall 125. For example, tungsten emitters can be formed by sputtering, by vapor deposition or by chemical vapor deposition. In a variant of this technique, the internal structure 121 can be fabricated together with the second wall 125 so that the internal structure is integral with the second wall. Also, although the internal structure is shown as completely dividing the space between walls 124 and wall 125 into entirely separate spaces 122, these spaces may communicate with one another. For example, as shown in FIG. 9, the internal structure may be formed as spaced apart columns 12' rather than as continuous walls, so that the entire space between walls 124 and walls 125 is a single, unitary interior space.

The device shown in FIGS. 3 and 4 is used in a manner similar to the device discussed above with reference to FIG. 1. Thus, emitter electrodes 144 are connected to a high voltage terminal of a power supply, whereas the second electrode 150 is connected to a lower potential, preferably by connecting the second electrode to ground through as a resistor as discussed above with reference to FIG. 1. A third, grounded electrode (not shown), is provided remote from the device. Second wall 125 is exposed to a plenum or manifold containing the fluid to be atomized so that the fluid passes into interior spaces 122 through a fluid entry holes 130 and passes out through discharge orifices 126. Here again, the electric field between emitter electrode 144 and the second or external electrode 150 causes injection of electrical charge into the fluid passing downstream into discharge orifices 126. The injected electrical charge causes atomization of the fluid.

Although devices as shown in FIGS. 3 and 4 can be fabricated in any size, this configuration is particularly well-suited to provide numerous small-diameter orifices. Thus, the discharge orifices 126 desirably are less than about 500 μm in diameter, more preferably less than about 200 μm in diameter, and most preferably less than about 50 μm in diameter. The spacing between adjacent orifices 126 desirably is about 500 μm or less, and more preferably about 125 μm or less. The axial distance (in the direction along the axis of the discharge orifice) between the tip of each emitter electrode 144 and the upstream end of the associated orifice 126 desirably is between about one half to about two times the diameter of the orifice. Lesser spacing is desirable provided that it does not result in dielectric breakdown and shorting between the emitter electrode and the counter electrode.

The use of multiple orifices in the device provides several significant advantages. First, plugging or other problems affecting one orifice will not cause complete failure of the device. For example, where the device is used to atomize fuel for combustion, an acceptable flame can be maintained even if one or a few of the orifices becomes plugged or otherwise unusable. Further, for a given flow rate and pressure, the individual orifices in a multi-orifice device can be of smaller diameter. As discussed above, the preferred spacing between the emitter electrode and the orifice is directly related to the orifice diameter. By reducing the orifice diameter, one can reduce the spacing between the emitter electrode and the orifice, and hence the spacing between the emitter electrodes 144 and counter electrode 150. Moreover, smaller orifice size favors atomization with lower voltages for reasons associated with the configuration of the electric fields at a droplet exiting from the orifice. All of these factors facilitate operation with lower voltages and hence facilitate the use of simpler, more compact and less expensive high voltage power supplies. For example, an atomization device incorporating thirteen 15 μm diameter discharge orifices 26 at 114 micron spacings provides a total orifice area equal to a single 54 micron diameter orifice within a chip about 2 mm by 2 mm, and accommodates flow rates on the order of 0.01–0.02 milliliters per second of the diesel fuel, jet fuel or kerosene. Combustion of fluid at this rate provides about 400 watts total thermal output. The device can operate with fluid inlet pressure on the order of 70 kPa or 10 psig, although considerably higher pressures can be used to provide higher flow rates without damaging the device. The operating voltage is on the order of 3 kV or less, and desirably about 1 kV or less. Also, any number of orifices can be used to provide a device with greater or lesser flow capability without altering the other operating characteristics of the device.

Atomizing apparatus partially depicted in FIGS. 5 and 6 includes a body 220 defining an interior space (not shown) and a discharge orifice 226 similar to the corresponding elements discussed above with reference to FIGS. 1 and 2. Here again, a second electrode or counter electrode 250 is disposed on the exterior surface of the downstream or first wall 228 of the body and surrounds orifice 226. A gate 201 overlies the exterior surface 228 of the first wall and overlies counter electrode 250. Gate 201 is mounted to body 220 for rotation about an axis 203 spaced apart from the axis 226 so that the gate can be moved relative to body 220 between the retracted position illustrated in solid lines, the partially extended position illustrated at 201' in FIG. 6 and the fully extended position illustrated in broken lines at 201" in FIG. 6. In the fully extended position 201", the gate completely blocks orifice 226 whereas in the partially extended position 201' of the gate partially occludes the orifice and thus reduces its effective diameter. As explained in greater detail in co-pending, commonly assigned U.S. patent application Ser. No. 09/237,583, filed Jan. 26,1999, the disclosure of which is hereby incorporated by reference herein, a variable size orifice such as an orifice provided with a movable gate can be used to regulate the flow rate of the fluid to be atomized through the device. Other means for providing a variable size orifice may be employed. For example, as shown in greater detail in the '583 application, the discharge orifice may be defined by a pair of elements movable towards and away from one another to vary the size of the orifice.

As in the embodiments discussed above, the interior space within the housing is substantially devoid of exposed conductive surfaces, and, in particular, exposed conductive surfaces at a potential different from the potential at the charge injection device, so that there are no substantial electric field between exposed conductive surfaces exposed to the interior space. This arrangement is particularly valuable when used with a variable-size orifice. When such an orifice is partially closed, it acts like a small-diameter orifice and is particularly prone to clogging due to soot inside the chamber.

According to a further embodiment of the invention, counter electrode 250 may be omitted and gate 201 may act as the counter electrode in addition to acting as a flow restricting element. Thus, provided the gate is formed from a conductive material and connected to ground or another potential source, the gate can perform the same functions as counter electrode 250. Here again, the conductive electrode or gate overlies the exterior surface of downstream wall 228, and is electrically insulated from the interior space within the body.

A device according to another embodiment of the invention utilizes a second electrode 350 in the form of a small tube extending partially into the dielectric front wall 324 so that the second electrode defines a portion of the orifice 326. In other respects, this structure is identical to the structure discussed above with reference to FIGS. 1 and 2. A structure as illustrated in FIG. 7 is less preferred as some soot buildup may occur in the tubular second electrode itself. Nonetheless, because the second electrode is not directly exposed within the interior space 322 of the device is less prone to soot buildup than a structure wherein the second electrode is exposed to the interior space.

A device according to a further embodiment of the invention includes a housing 420 defining an interior space 422 and a discharge orifice 426 in a front or downstream wall 428 as discussed above. Here, however, the charge injection electrode is replaced by an electron beam gun 401 having an electron transmissive beam window 403 facing interior space 422 just upstream of nozzle 426. As explained in greater detail in commonly assigned U.S. Pat. Nos. 5,378,957 and 5,093,602, the disclosures of which are incorporated by reference herein, such a beam gun typically includes an electron accelerating tube 405, a cathode 407 mounted within the tube and one or more accelerating electrodes 409. The space within the tube 405 typically is maintained under vacuum. A beam power source 411 is connected to the cathode 407 and to the electron accelerating electrodes 409. Electrons leave cathode 407 and are directed in a beam through window 403 into the interior space 422 within housing 420 and into the fluid as it passes through orifice 426. Here again, the interior space within the housing is devoid of conductive elements other than the beam window 403, which may be electrically conductive. As discussed above in connection with the embodiments using electron-emitting electrodes, the absence of electric fields between conductive elements exposed to the interior space 422 minimizes soot deposition within the interior space and minimizes plugging of the orifice. As described in greater detail in the aforementioned patents, one or more electrodes 413 may be provided in proximity to orifice 426. Such electrodes may be provided, for example, at ground potential, or at other potentials different from the potential at the electron window 403. Preferably, such electrodes are disposed outside of the body as, for example, on the exposed, outwardly facing surface 428 of the front wall.

Numerous variations and combinations of the features discussed above can be utilized without departing from the present invention as defined by the claims. For example, the high voltage sources used to power the devices incorporating charge-emitting electrodes may have any polarity, and may have alternating polarity. The counter electrode need not be disposed on an exterior surface of the device. For example, a counter electrode can be disposed inside a wall of the device and embedded in the dielectric material of the wall. Such an embedded electrode will still be isolated from the interior space. In other embodiments, the body of the device, including the downstream or front wall, may be fabricated from a metal structural material and coated with a dielectric material on its interior surfaces so as to isolate the metal surfaces from the interior space. For example, a dielectric coating can be applied by spin-coating a polymer precursor such as an uncured polyimide on the metal surface and then curing the polymer precursor; by sputtering; or by chemical vapor deposition. Because such a dielectric coating need not provide structural strength, it can be considerably thinner than a dielectric structural wall. This, in turn, reduces the distance between the charge injection electrode and the counter electrode in a triode-type device, and thus reduces the operating voltage required to yield a given electric field.

The constructional features discussed above with reference to FIGS. 3 and 4, including multiple orifices in a single device, can be employed without using the other features of the invention. For example, multiple orifices may be provided in a device having exposed conductive surfaces in the interior space as, for example, where the front wall of the device is formed entirely from a metal so that the front wall itself acts as the second electrode. Such an arrangement is markedly less preferred as it sacrifices the advantages discussed above with reference to prevention of soot buildup. However, it can be employed in the case where the fluid is particularly resistant to soot formation or where the device need only operate for a brief time as, for example, in certain disposable devices.

The particular materials discussed above are merely illustrative. For example, other dielectric materials such as undoped diamond can be employed. Also, conductive materials other than metals can be employed in the electrodes.

As these and other variations and combinations of the features as discussed above can be utilized without departing from the present invention, the foregoing description of the preferred embodiments should be taken by way of illustration rather than by way of limitation of the invention as defined by the claims.

What is claimed is:

1. An electrostatic atomizer comprising:
   (a) a body defining an interior space, an exterior surface, an orifice extending through said body from said interior space to said exterior surface and a fluid entry port communicating with said interior space remote from said orifice;
   (b) a charge injection structure having a downstream end disposed within said interior space in the vicinity of said orifice; and
   (c) a counter electrode disposed in the vicinity of said orifice and electrically isolated from said charge injection structure;
   (d) said body comprising a dielectric structure having a portion disposed directly between said counter electrode and said interior space and directly between said downstream end of said charge injection structure and said counter electrode, whereby said counter electrode is electrically insulated from said interior space, said atomizer being devoid of electrically conductive surfaces other than surfaces of said charge injection structure exposed to said interior space in the vicinity of said charge injection structure.

2. An atomizer as claimed in claim 1 wherein said charge injection structure is an electrode.

3. An atomizer as claimed in claim 1 wherein said charge injection structure is an electron gun.

4. An atomizer as claimed in claim 1 wherein said body includes a dielectric material and the dielectric material of said body serves as said dielectric structure.

5. An atomizer as claimed in claim 4 wherein said counter electrode overlies said exterior surface in the vicinity of said orifice.

6. An atomizer as claimed in claim 5 wherein said counter electrode is a gate movable with respect to said body between a retracted position and an extended position in which said gate at least partially occludes said orifice.

7. An atomizer as claimed in claim 5 wherein said dielectric material of said body defines said orifice and said exterior surface.

8. An atomizer as claimed in claim 7 wherein said counter electrode is formed as an electrically conductive coating on said exterior surface.

9. An atomizer as claimed in claim 8 wherein said counter electrode is formed as a plated layer on said exterior surface.

10. An atomizer as claimed in claim 7 wherein said orifice and said exterior surface are formed by molding said dielectric material.

11. An atomizer as claimed in claim 10 wherein said dielectric material is a polymer and said orifice and said exterior surface are formed by injection molding said polymer.

12. An atomizer as claimed in claim 10 wherein said dielectric material is a ceramic.

13. An atomizer as claimed in claim 1 further comprising a gate mounted to said body for movement between a retracted position and an extended position in which said gate partially occludes said orifice.

14. An atomizer as claimed in claim 1 further comprising means for varying the effective diameter of said orifice.

15. An atomizer as claimed in claim 1 wherein said body is a unitary structure having a plurality of orifices including the first said orifice extending through said body from said interior space to said exterior surface, the charge injection structure including a plurality of charge injection electrodes.

16. An atomizer as claimed in claim 15 wherein said counter electrode is a unitary conductive structure overlying the exterior surface of the body and surrounding each of said orifices.

17. An atomizer as claimed in claim 1 wherein said orifice has a diameter of at most 1 mm.

18. An atomizer as claimed in claim 1 wherein said orifice has a diameter of at most 200 $\mu$m.

19. An atomizer as claimed in claim 1 wherein said orifice has a diameter of at most 50 $\mu$m.

20. An electrostatic atomizer comprising;
(a) a body having at least one interior space, a first wall bounding said at least one interior space and defining an exterior surface, and a plurality of discharge orifices extending between said exterior surface and said at least one interior space, said body defining at least one fluid inlet communicating with said at least one interior space remote from said orifice;
(b) a plurality of charge injection electrodes mounted in said at least one interior space and disposed adjacent to said orifices, said first wall and said orifices being disposed downstream of said charge injection electrodes so that said electrodes are completely upstream of said orifices; and
(c) at least one counter electrode disposed adjacent to said orifices.

21. An atomizer as claimed in claim 20 wherein said orifices are less than about 200 $\mu$m in diameter.

22. An atomizer as claimed in claim 21 wherein said orifices are spaced apart from one another by less than about 500 $\mu$m.

23. An atomizer as claimed in claim 22 wherein said orifices are less than about 50 $\mu$m in diameter and spaced apart from one another by less than about 125 $\mu$m.

24. An atomizer as claimed in claim 20 wherein said body includes a second wall extending generally parallel to said first wall and an internal structure extending between said first and second walls, said at least one interior space being disposed between said first and second walls, said second wall defining said at least one fluid inlet.

25. An atomizer as claimed in claim 24 wherein said charge injection electrodes are mounted to said second wall.

26. An atomizer as claimed in claim 24 wherein said second wall includes a plurality of fluid inlet orifices having diameters smaller than diameters of said fluid discharge orifices defined by said first wall cooperatively defining a filter.

27. An atomizer as claimed in claim 24 wherein said internal structure is formed integrally with at least one of said first wall and said second wall.

28. An atomizer as claimed in claim 27 wherein said integrally formed structure is formed from a single wafer by photoetching the wafer.

29. An electrostatic atomizer comprising:
(a) a body having at least one interior space, a first wall bounding said at least one interior space and defining an exterior surface, and a plurality of orifices extending between said exterior surface and said at least one interior space, said body defining at least one fluid inlet communicating with said at least one interior space remote from said orifice;
(b) a plurality of charge injection electrodes mounted in said at least one interior space and disposed adjacent said orifices; and
(c) at least one counter electrode disposed adjacent to said orifices,
wherein said body includes a second wall extending generally parallel to said first wall and includes an internal structure extending between said first and second walls, said at least one interior space being disposed between said first and second walls, said second wall defining said at least one fluid inlet,
wherein said internal structure includes a plurality of internal walls extending between said first and second walls, and said at least one interior space includes a plurality of interior spaces, each said interior space being bounded by said first wall, said second wall and some of said interior walls.

30. An electrostatic atomizer comprising;
(a) a body defining an interior space, an exterior surface, an orifice extending through said body from said interior space to said exterior surface and a fluid entry port communicating with said interior space remote from said orifice;
(b) a charge injection structure having a downstream end disposed within said interior space upstream of said orifice; and
(c) a counter electrode disposed in the vicinity of said orifice and electrically isolated from said charge injection structure;
said body including a dielectric having a portion disposed directly between said counter electrode and said interior space, said portion of said dielectric also being disposed directly between said counter electrode and said downstream end of said charge injection structure,
said interior space being devoid of exposed electrically conductive surfaces other than at said charge injection structure.

* * * * *